United States Patent
Melick et al.

(10) Patent No.: US 8,085,813 B2
(45) Date of Patent: *Dec. 27, 2011

(54) METHOD FOR ROUTING DATA PACKETS USING AN IP ADDRESS BASED ON GEO POSITION

(75) Inventors: Bruce D. Melick, Cedar Rapids, IA (US); David M. Snyder, Cedar Rapids, IA (US); Leslie D. Baych, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/318,283

(22) Filed: Dec. 23, 2005

(65) Prior Publication Data

US 2006/0165015 A1 Jul. 27, 2006

Related U.S. Application Data (63) Continuation-in-part of application No. 09/803,270, filed on Mar. 8, 2001, now Pat. No. 6,980,566, said application No. 11/318,283 is a continuation-in-part of application No. 11/170,489, filed on Jun. 29, 2005, which is a continuation of application No. 10/602,125, filed on Jun. 23, 2003, now Pat. No. 6,976,034, which is a continuation of application No. 09/698,793, filed on Oct. 27, 2000, now Pat. No. 6,868,419, said application No. 11/318,283 is a continuation-in-part of application No. 10/778,878, filed on Feb. 13, 2004, now Pat. No. 7,181,247.

(60) Provisional application No. 60/188,416, filed on Mar. 10, 2001, provisional application No. 60/220,749, filed on Jul. 26, 2000, provisional application No. 60/163,426, filed on Nov. 3, 1999, provisional application No. 60/162,094, filed on Oct. 28, 1999, provisional application No. 60/447,621, filed on Feb. 14, 2003.

(51) Int. Cl.
*H04J 3/24* (2006.01)
(52) U.S. Cl. ........................................................ 370/473
(58) Field of Classification Search ............. 340/539.13; 342/357.06; 370/389, 392, 395.1, 395.52, 370/395.55, 471, 475; 701/213
See application file for complete search history.

(56) References Cited

U.S. PATENT DOCUMENTS 3,836,951 A 9/1974 Geren et al.
(Continued)

FOREIGN PATENT DOCUMENTS

WO WO 00/41383 7/2000
(Continued)

OTHER PUBLICATIONS

Clede, Bill, "The concept of CDPD makes sense", http://www.clede.com/Articles/Police/cdpd.htm, Feb. 1995.
(Continued)

*Primary Examiner* — Yong Zhou
(74) *Attorney, Agent, or Firm* — McKee, Voorhees & Sease, P.L.C.

(57) ABSTRACT

Method of routing data over a network in which contact is made with a home network to determine the reported geo-position, using this geo-position to transmit data to the device over a path through a node in which the node reads the geo-position, accesses a list of possible recipients and their geo-positions, compares its location to the positions, selects a recipient based at least in part on the proximity of the recipient to the device, and transmits the data over the best path. Eventually, the device becomes the recipient. A geo-position may be transmitted as part of an IP address, or as geo-position data or XML tagged geo-position information contained in a data packet or IP addressed message or IP addressed voice calls (VoIP). The geo-position information can be generated from a GPS receiver. This method and/or IP address may be used in a method of doing business in which the geo-position is used to identify the source and location for delivery. This information may be incorporated into a purchase order or confirmation receipt.

20 Claims, 3 Drawing Sheets

U.S. PATENT DOCUMENTS

| | | | |
|---|---|---|---|
| 3,903,371 | A | 9/1975 | Colton et al. |
| 3,906,484 | A | 9/1975 | Melvin et al. |
| 4,357,634 | A | 11/1982 | Chung |
| 4,434,323 | A | 2/1984 | Levine et al. |
| 4,513,403 | A | 4/1985 | Troy |
| 4,641,317 | A | 2/1987 | Fullerton |
| 4,706,264 | A | 11/1987 | Chung |
| 4,813,057 | A | 3/1989 | Fullerton |
| 4,939,726 | A | 7/1990 | Flammer et al. |
| 5,050,189 | A | 9/1991 | Cox et al. |
| 5,088,032 | A | 2/1992 | Bosack |
| 5,132,986 | A | 7/1992 | Endo et al. |
| 5,155,857 | A | 10/1992 | Kunisak et al. |
| 5,339,421 | A | 8/1994 | Housel, III |
| 5,363,108 | A | 11/1994 | Fullerton |
| 5,400,254 | A * | 3/1995 | Fujita .......................... 701/213 |
| 5,414,455 | A | 5/1995 | Hooper et al. |
| 5,425,021 | A | 6/1995 | Derby et al. |
| 5,442,390 | A | 8/1995 | Hooper et al. |
| 5,453,977 | A | 9/1995 | Flammer et al. |
| 5,497,373 | A | 3/1996 | Hulen et al. |
| 5,523,761 | A * | 6/1996 | Gildea ..................... 342/357.03 |
| 5,526,035 | A | 6/1996 | Lappington et al. |
| 5,560,038 | A | 9/1996 | Haddock |
| 5,581,706 | A | 12/1996 | Jessup et al. |
| 5,636,216 | A | 6/1997 | Fox et al. |
| 5,666,390 | A | 9/1997 | Morzano |
| 5,677,927 | A | 10/1997 | Fullerton et al. |
| 5,706,495 | A | 1/1998 | Chadha et al. |
| 5,737,595 | A | 4/1998 | Cohen et al. |
| 5,754,849 | A | 5/1998 | Dryer et al. |
| 5,764,745 | A * | 6/1998 | Chan et al. ............... 379/221.13 |
| 5,818,442 | A | 10/1998 | Adamson |
| 5,832,035 | A | 11/1998 | Fullerton |
| 5,841,764 | A | 11/1998 | Roderique et al. |
| 5,852,825 | A | 12/1998 | Winslow |
| 5,951,646 | A | 9/1999 | Brandon |
| 5,952,956 | A | 9/1999 | Fullerton |
| 5,952,958 | A | 9/1999 | Speasl et al. |
| 5,956,729 | A | 9/1999 | Goetz et al. |
| 5,974,416 | A | 10/1999 | Anand et al. |
| 5,982,276 | A | 11/1999 | Stewart |
| 6,026,125 | A | 2/2000 | Larrick et al. |
| 6,031,862 | A | 2/2000 | Fullerton et al. |
| 6,049,806 | A | 4/2000 | Crecine |
| 6,049,848 | A | 4/2000 | Yates et al. |
| 6,054,950 | A | 4/2000 | Fontana |
| 6,061,057 | A | 5/2000 | Knowlton et al. |
| 6,097,802 | A * | 8/2000 | Fleischer et al. ......... 379/211.02 |
| 6,112,207 | A | 8/2000 | Nori et al. |
| 6,151,602 | A | 11/2000 | Hejlsberg et al. |
| 6,185,290 | B1 | 2/2001 | Shaffer et al. |
| 6,195,484 | B1 | 2/2001 | Brennan, II et al. |
| 6,236,652 | B1 | 5/2001 | Preston et al. |
| 6,250,309 | B1 | 6/2001 | Krichen et al. |
| 6,272,316 | B1 | 8/2001 | Wiedemann et al. |
| 6,354,946 | B1 | 3/2002 | Finn |
| 6,356,946 | B1 | 3/2002 | Clegg et al. |
| 6,363,320 | B1 | 3/2002 | Chou |
| 6,427,150 | B1 | 7/2002 | Oashi et al. |
| 6,430,208 | B1 | 8/2002 | Fullerton et al. |
| 6,438,140 | B1 | 8/2002 | Jungers et al. |
| 6,466,571 | B1 * | 10/2002 | Dynarski et al. ............. 370/352 |
| 6,496,104 | B2 | 12/2002 | Kline |
| 6,505,032 | B1 | 1/2003 | McCorkle et al. |
| 6,532,256 | B2 | 3/2003 | Miller |
| 6,536,043 | B1 | 3/2003 | Guedalia |
| 6,684,250 | B2 | 1/2004 | Anderson et al. |
| 6,757,740 | B1 | 6/2004 | Parekh et al. |
| 6,781,530 | B2 | 8/2004 | Moore |
| 6,782,048 | B2 | 8/2004 | Santhoff |
| 6,795,434 | B1 * | 9/2004 | Kumar et al. ................ 370/392 |
| 6,868,419 | B1 | 3/2005 | Melick et al. |
| 2001/0015965 | A1 | 8/2001 | Preston |
| 2001/0036183 | A1 | 11/2001 | Melick et al. |
| 2001/0053175 | A1 | 12/2001 | Hoctor |
| 2002/0004844 | A1 * | 1/2002 | Harari et al. ................. 709/238 |
| 2002/0016905 | A1 | 2/2002 | Kojima |
| 2002/0018458 | A1 | 2/2002 | Aiello et al. |
| 2002/0018514 | A1 | 2/2002 | Haynes |
| 2002/0048351 | A1 * | 4/2002 | Donovan et al. ........... 379/88.17 |
| 2002/0058507 | A1 * | 5/2002 | Valentine et al. ............. 455/433 |
| 2002/0059642 | A1 | 5/2002 | Russ |
| 2002/0075975 | A1 | 6/2002 | Fugger et al. |
| 2002/0076193 | A1 | 6/2002 | Melick et al. |
| 2002/0089423 | A1 | 7/2002 | Przygoda |
| 2002/0097790 | A1 | 7/2002 | Dress |
| 2002/0172291 | A1 | 11/2002 | Maggio |
| 2002/0190786 | A1 | 12/2002 | Yoon |
| 2003/0076248 | A1 | 4/2003 | Larson |
| 2003/0093567 | A1 | 5/2003 | Lolayekar |
| 2003/0095063 | A1 | 5/2003 | Fullerton |
| 2003/0095609 | A1 | 5/2003 | Cowie |
| 2003/0162498 | A1 | 8/2003 | Rofheart et al. |
| 2003/0174048 | A1 | 9/2003 | McCorckle |
| 2005/0234922 | A1 * | 10/2005 | Parekh et al. ................... 707/10 |

FOREIGN PATENT DOCUMENTS

| | | |
|---|---|---|
| WO | WO 00/54488 | 9/2000 |
| WO | WO 01/97477 A2 | 12/2001 |

OTHER PUBLICATIONS

Lougheed et al., Internet RFC/STD/FYI/BCP Archives, A Border Gateway Protocol (BGP), http://www.faqs.org/rfcs/rfc1163.html, Jun. 1990.

Tisal, Joachim, "GSM Cellular Radio Telephony", pp. 20-165, John Wiley & Sons, Editors, 1995.

Negroponte, Nicholas, "Being Digital", First Vintage Books Edition, Jan. 1996.

Schneiderman, Ron, "Future Talk: The Changing Wireless Game", IEEE Press Marketing, 1997.

Dodd, Anabel Z., "The Essential Guide to Telecommunications", Second Edition, 1999.

Xun Su's Little Simulator for Dijkstra's Algorithm, Copyright (c) Xun Su 1998, adapted from original code by Carla Laffra, 1996, http://www.ece.utexas.edu/~xsu/shortest.html.

Tech/Encyclopedia, "TCP/IP abc's", http://www.techweb.com/encyclopedia/defineterm?term=TCP/IP%20abc's, printed off web Feb. 24, 2000.

Joel Conover, Slicing Through IP Switching, Network Computing, Mar. 15, 1998, Issue: 905.

Socolofsky et al., Network Working Group, "A TCP/IP Tutorial", ftp://ftp.rfc-editor.org/in-notes/rfc1180.txt, Jan. 1991.

Orubeondo, Ana, Mobile IP will fuel mobile computing boom, CNN.com technology, http://www.cnn.com/2000/TECH/computing/03/01/mobile.ip.idg/index.html. printed off web Mar. 2, 2000.

Postel, Jon, Editor, Sep. 1981, Internet Protocol, Darpa Internet Program, prepared for Defense Advanced Research Projects Agency by Information Sciences Institute, http://194.52.182.96/rfc/rfc791.html printed off web Feb. 24, 2000.

Win, Moe Z., et al., "Ultra-Wide Bandwidth Signal Propagation for Indoor Wireless Communications", IEEE International Conference on Communications—Montreal, Canada, Jun. 1997.

Ruettgers, Michael C., "E-Infostructure: EMC's Vision for Accelerating the New Economy", Recent Speeches & Articles, http://www.emc.com/about/management/speeches/cebit.jsp, printed off web Dec. 12, 2000.

Ruettgers, Michael C., Thriving in the Information Economy, Recent Speeches & Articles, The Wired Index Event, New York City, May 13, 1999, http://www.emc.com/about/management/speeches/wired_index.jsp, printed off web Oct. 23, 2000.

EMC Corporation, "Universal Data Tone", http://www.emc.com/about/data_tone/index.jsp printed off web Oct. 23, 2000.

Win, Moe Z., et al., "Impulse Radio: How it works", IEEE Communications Letters, vol. 2, No. 1, Jan. 1998.

Maney, Kevin, "Pulsing with promise: New digital technology likely to revolutionize how we live", USA Today Money, Apr. 9, 1999.

Stallings, William, Data and Computer Communications, Fifth Edition, 1997 by Prentice-Hall, Inc.

Merriam-Webster's Collegiate Dictionary, Tenth Edition, Meriam-Webster, Incorporated, Springfield, Massachusetts, U.S.A., p. 902.

Pulse~Link, "Ultra Wideband Over Cable Technologies: Enhancing Cable Television Bandwidth Capacity Without Modification to Existing Infrastructure", 2002 Pulse~Link, Inc.

* cited by examiner

METHOD FOR ROUTING DATA PACKETS USING AN IP ADDRESS BASED ON GEO POSITION

CROSS REFERENCE TO RELATED APPLICATION

This application claims priority to and is a Continuation-in-part of U.S. patent application Ser. No. 09/803,270, filed Mar. 8, 2001 which claims priority to U.S. Provisional Patent Application No. 60/188,416 filed Mar. 10, 2001; this application is also a Continuation-in-part of U.S. patent application Ser. No. 11/170,489, filed Jun. 29, 2005 which is a Continuation of U.S. patent application Ser. No. 10/602,125, filed Jun. 23, 2003 and now U.S. Pat. No. 6,976,034 which is a Continuation of Ser. No. 09/698,793, filed Oct. 27, 2000 and now U.S. Pat. No. 6,868,419, which claims priority to U.S. Provisional Patent Application No. 60/220,749 filed Jul. 26, 2000 and U.S. Provisional Patent Application No. 60/163,426 filed Nov. 3, 1999 and U.S. Provisional Patent Application No. 60/162,094 filed Oct. 28, 1999. This application is also a Continuation-in-part of U.S. patent application Ser. No. 10/778,878 filed Feb. 13, 2004 which claims priority to U S. Provisional Patent Application No. 60/447,621 filed Feb. 14, 2003. All applications are hereby incorporated by reference in their entirety.

BACKGROUND OF THE INVENTION

1. Field of the Invention

The present invention relates generally to a method for routing data packets and IP addressed messages, and IP addressed voice calls. More particularly, the present invention relates to transmission control protocol based on Internet protocol, which uses geo-position instead of an IP address, or geo-positions cross-referenced to an IP address in a database, or geo-position information contained in a data packet—which may be tagged using XML.

2. Problems in the Art

Currently, an application, such as a mail program, which desires to send or receive data, must rely on the TCP/IP layered set of protocols. Though other transmission control protocols, such as file transfer protocol, link access protocol, balanced file transfer access method, product definition interchange format, and asynchronous transfer mode, exist, it is the transmission control protocol/internet protocol (TCP/IP) which has become dominantly used. In general, TCP, transmission control protocol, is responsible for ensuring that data and other commands get through to the desired location. IP, or Internet Protocol, is a set of commands relied upon by TCP and others to get the data to its desired location. IP uses what have become known as IP addresses.

An IP address is currently a 32-bit number that identifies the sender and receiver of information. As the number of IP addresses is rapidly approaching the capacity limits of a 32-bit based number, there is a trend to implement a 128-bit based IP address system, known as Internet Protocol version 6 (IPv6). IPv6 is a more efficient protocol than the current version, IPv4, because there are so many more addresses available and can be distributed much more efficiently, greatly reducing the amount of work routers have to do. Even so, IPv6 cannot mathematically self-route data packets. IPv6 must provide similar guarantees of anonymity as the current version, IPv4, which occurs using a "dynamic host" system that changes the users' various addresses. However, the requirement of a "dynamic host" is an extra step that requires computing resources and additional time on the telecommunication network.

The IP address has two parts, a particular network identifier and a specific device identifier. A router is either a device or a piece of software which is used to direct the flow of traffic and does so by examining the network portion of the IP address. Routers are connected to at least two networks on a gateway. The router maintains a table or library of available networks and determines, based on its understanding of the state of the networks it is connected to, just how a packet of data should be sent across the Internet. This library may be either a static routing table or a dynamic routing table.

A static routing table does not adjust to ever changing network conditions, so each change in the table or library must be done manually by the network administrator. Dynamic routing tables are built not by network administrators, but by routing protocols. These routing protocols exchange routing information and this information is then used to update the routing table. A routing protocol allows the gateways to adapt to network changes. Depending on whether the system on which routing is to occur is autonomous, the network administrator may choose to use either an interior or exterior routing protocol.

There are many interior routing protocols. Two such interior routing protocols are the routing information protocol and the open shortest path first protocol. Routing information protocol selects a route with the lowest number of gateways through which data must pass to reach its destination. It follows a distance-vector algorithm.

Open shortest path first protocol builds a directed graph of the entire network using the Dijkstra shortest path first algorithm. This algorithm works by assigning a cost of 0 to the root system in the network. It then locates the neighbors of the system and calculates the cost to reach each neighbor based on the sum of the cost to reach the system just installed plus the cost advertised for reaching each neighbor.

The open shortest path first protocol system must locate its neighbors through the use of hello packets. These hello packets are sent and then the system must listen for a return hello packet. The hello packet identifies the local router and lists the adjacent routers from which it has received packets. Receipt of a hello packet informs the router that it is an adjacent router to the sender and therefore this sender is a neighbor. This newly discovered neighbor is then added to the library.

The open shortest path first protocol then advertises all of its neighbors by flooding a Link State Advertisement (LSA) to the entire network. Another complex function of the protocol is to ensure no flooding of duplicate LSAs. This is done by comparing each LSA to previously received LSAs and discarding and duplicates.

Exterior routing protocols exchange routing information between autonomous systems. The leading exterior routing protocol is Border Gateway Protocol (BGP). BGP exchanges reachability through update messages. Like hello packets, these update messages are then used to build a routing table. Unlike open shortest path first protocol, BGP supports policy based routing which employs political, organizational, and security considerations when making routing decisions.

BGP acquires its neighbors through a standard TCP handshake and refers to them as peers. These peers send each other complete routing table updates when the connection is initially established. After the initial encounter, peers only send each other changes or messages indicating that they are still alive called Keepalive messages.

The use of hello packets, LSA, update messages, and keepalive messages is an unnecessary waste of computer and network processing, speed, and storage. These various messages all serve to update and monitor the routing table which is used to determine the best path for a data packet to take.

As communications move into the wireless age, it is becoming more and more important to develop a method of sending and receiving data from any point on earth. There is an effort under way to establish a mobile IP standard which would allow a user of any device which is capable of accessing the Internet to send and receive data from any point on earth.

Mobile IP allows any mobile node to move about, changing its point of attachment to the Internet, while continuing to be identified by its home IP address. Correspondent nodes send IP datagrams to a mobile node at its home address in the same way as with any other destination. This scheme allows transparent interoperation between mobile nodes and their correspondent nodes, but forces all datagrams for a mobile node to be routed through its home agent. Thus, datagrams to the mobile node are often routed along paths that are significantly longer than optimal. For example, if a mobile node is visiting some subnet, even datagrams from a correspondent node on the same subnet must be routed through the Internet to the mobile node's home agent (on its home network), only then to be tunneled back to the original subnet for final delivery. This indirect routing delays the delivery of the datagrams to mobile nodes, and places an unnecessary burden on the networks and routers along their paths through the Internet.

There is therefore a need for a method of routing data packets, which avoids these and other problems.

Features of the Invention

A general feature of the present invention is the provision of method of routing data packets and IP addressed IP addressed messages, and IP addressed voice calls, which overcomes the problems found in the prior art.

A further feature of the present invention is the provision of a modified IP address which includes a geographic position based header.

A further feature of the present invention is the provision of a transmission control protocol which is based on the Internet protocol using geographic position.

Another feature of the present invention is the provision of a method of routing data packets and IP addressed messages, and IP addressed voice calls based on a modified IP address which includes a geographic position based header.

Another feature of the present invention is the provision of a method of routing data packets based on the geographic position ("geo-position") header which requires no library of neighbors or peers beyond those neighbors or peers directly connected to the sending system.

A still further feature of the present invention is the provision of a method of routing data packets and IP addressed messages, and IP addressed voice calls which mathematically determines the shortest path available to the next system based on the geo-position based header.

A still further feature of the present invention is the provision of a method of using geo-position IP address in conjunction with GPS time and date stamps to automatically create unique identification numbers that can become the basis of a method of doing business that will identify the sender by geographic position, and with the addition of the GPS time and date stamp to the geographic position create unique purchase order numbers, ship confirm numbers, pallet identifiers, order numbers, etc., and can be used as self-routers for all types of business transactions.

These, and/or other features and advantages of the present invention will become apparent from the following specification and claims.

SUMMARY OF THE INVENTION

The present invention generally comprises a method for routing data packets and IP addressed messages, and IP addressed voice calls. More particularly, the present invention comprises a method for routing data packets and IP addressed messages, and IP addressed voice calls based on a geographic position header contained in a modified IP address, or geo-positions cross-referenced to an IP address in a database, or geo-position information contained in a data packet—which may be tagged using XML.

A geographic position header is data referenced by spatial or geographic coordinates.

In a preferred embodiment, the present invention includes a modified IP address in which the network number currently assigned is replaced by a geographic position. Such geographic position may be constantly changing, and therefore the IP address of the device is constantly changing. These changes are accommodated by reporting of current geo-position to a telecommunications network such as is currently done in the cellular telephone industry.

Chip manufacturers, such as Intel, have proposed and even manufactured computer chips which include a unique identifier. This unique identifier may be used to identify a device, thereby eliminating the need for the network/specific device identifier system currently used in IP. As more and more networks are established and more and more devices are hooked to the Internet, specific device identification must become independent from any host network.

Using the geo-position in place of the IP network address allows the transfer control protocol to base all routing decisions on the physical location of the specific devices between which a connection is desired. The transmission control protocol using geo-position data will hereinafter be referred to as the GeoTCP. GeoTCP makes routing decisions by mathematically determining the shortest route between the two devices.

Upon determining where the two devices are located, GeoTCP will mathematically determine the shortest network distance between the two devices without requiring the transmission of data packets through either devices' home network. For instance, assume one device is roaming on a foreign network, but telling its home network of any change in the first device's geo-position. This information is stored on the home network in any type of memory. When the second device contacts the home network via GeoTCP, the home network will access the stored geo-position of the first device and inform the second device of the first device's geo-position. The second device will store this geo-position in its memory either permanently or temporarily. GeoTCP will use this geo-position in its calculation of the shortest network path with which to send data packets to the first device.

All systems, gateways, and other network devices (nodes) will have an independent geo-position and temporary and permanent memory or storage devices such as RAM, ROM, tape drives, or hard drives. Knowing their own geo-position allows all of these nodes to simply calculate where to send the data packets by knowing only their neighbors geo-position. The only library which must be maintained in the memory of the network or in a storage medium, is a neighborhood library. The neighborhood library will give the locations for all neighbors of the node. GeoTCP will ensure that there is a valid connection as is currently done. However, should a connection be lost, interrupted, too busy, or otherwise made unavailable, GeoTCP would make the determination of the next best node (recipient) to use based on the relative geo-position of all of the remaining neighbors. Once a connection has been established by GeoTCP, transfer of data packets to a specific device based on that device's geo-position is accomplished.

Currently, domain names are converted to IP addresses as computers cannot understand human language. This would not change, except rather than convert the domain name to an IP address using a network/specific device number, devices would convert domain names to a number which represents both the specific device identifier and the device's last known geo-position.

DETAILED DESCRIPTION OF THE PREFERRED EMBODIMENT(S)

Figure 1:
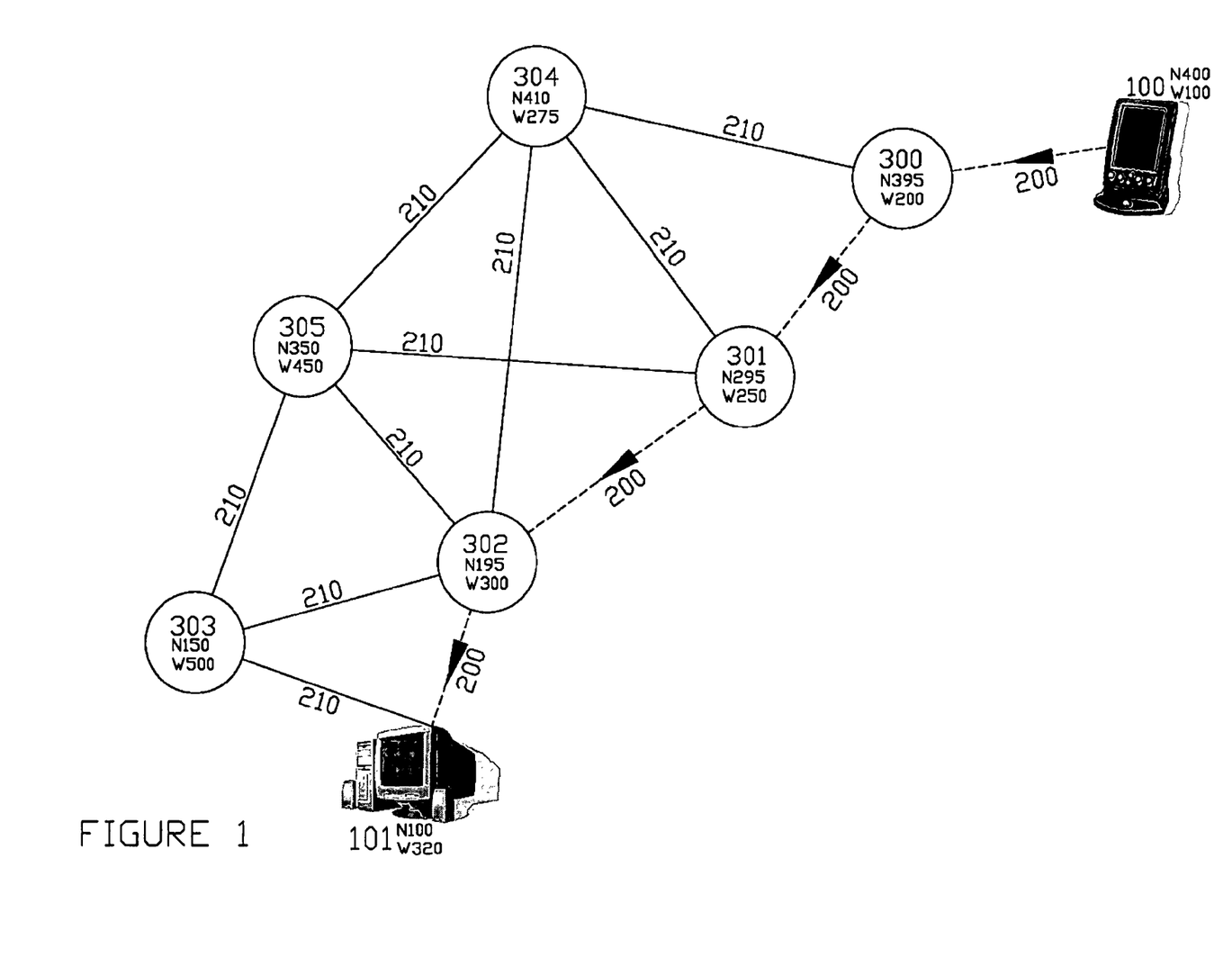
FIG. 1 is a representation of the mathematically, self-determined route between two devices connected to a telecommunications network.

In FIG. 1, device 100 is shown as a Personal Digital Assistant (PDA) connected to a telecommunications network. Item 100 is shown as a PDA, but may be a computer, a network server, a wireless phone, or any other device that has the capability of being connected to a network. The route depicted by a dotted line between the two devices, for the purpose of exchanging data, is the shortest route that can be mathematically self-determined using the geo-position of each device shown on the drawing.

Outdoor geo-position information may be obtained using any Global Navigation Satellite System, such as GPS or GLONASS.

Indoor geo-positions may be obtained by any number of means. There are patented schemes such Speasl et al, U.S. Pat. No. 5,952,958, or an ultra wideband system such as Robert J. Fontana, U.S. Pat. No. 6,054,950, or the time domain, ultra wideband system that is integrated and correlated with GPS and documented in U.S. patent application Ser. No. 09/686,181, Melick et al.

In addition, indoor and outdoor geo-position information may be obtained from commercially available software that drives map based information. Commercially available software such as AutoCAD MAP, and AutoCAD Mapguide can be used to control, store, and retrieve GPS data, and other data stored in other types of databases.

Examples of geo-position based IP addresses are, but not limited to, as the two show below.

EXAMPLE 1

In Lat/Long/Alt—Consists Of 3 Components 42.02.17.00=Latitude North (Deg.,Min.,Sec.,Decimal Seconds)
90.05.18.05=Longitude West (Deg.,Min.,Sec.,Decimal Seconds)
285.00=Altitude (Feet.,Decimal Feet)

A Lat/Long/Alt address might look like: 042021700.090051805.0028500

EXAMPLE 2

Earth Centered Earth Fixed (ECEF)—Consists of 4 Components

"ECEF=Cartesian coordinates with center of earth being 0,0,0, (x,y,z)"
10,000,000.56=Northing from Greenwich (Meters., Decimal Meters)
8,900,753.45=Easting from Greenwich (Meters., Decimal Meters)
285.00=Altitude Above Mean Sea Level (Feet., Decimal Feet)
Code No. For Datum, i.e. WGS84=1, North American 1927=2, Cape Canaveral=3, European 1979=4, etc.
An ECEF address might look like: 1000000056.0890075345.0028500.03

Device 101 is shown as a computer connected to a telecommunications network. Item 101 is shown as a computer, but may be a PDA, a network server, a wireless phone, or any other device that has the capability of being connected to a network.

PDA 100 and computer 101 are depicted as having a distinct instantaneous geo-position. Instantaneous means if PDA 100 or computer 101 are mobile, they will report on a regular basis to the telecommunications network their instantaneous geo-position. A fixed asset, such as a node 300, 301, 302, 303, 304, 305 will have unchanging instantaneous positions. PDA 100's geo-position is depicted as northing and westing offsets in any one of various specific co-ordinate systems, such as but not limited to WGS-84, North American 1927 or 1983, Cape Canaveral, European 1979, or any user-defined co-ordinate system. These geo-positions can alternately be depicted as longitudes and latitudes.

PDA 100 is telecommunicating data packets, which can be data, to device 101, a computer, which is also connected to the same telecommunications network. PDA 100 and computer 101 are capable of transmitting and/or receiving appropriately configured data packets.

Figure 2:
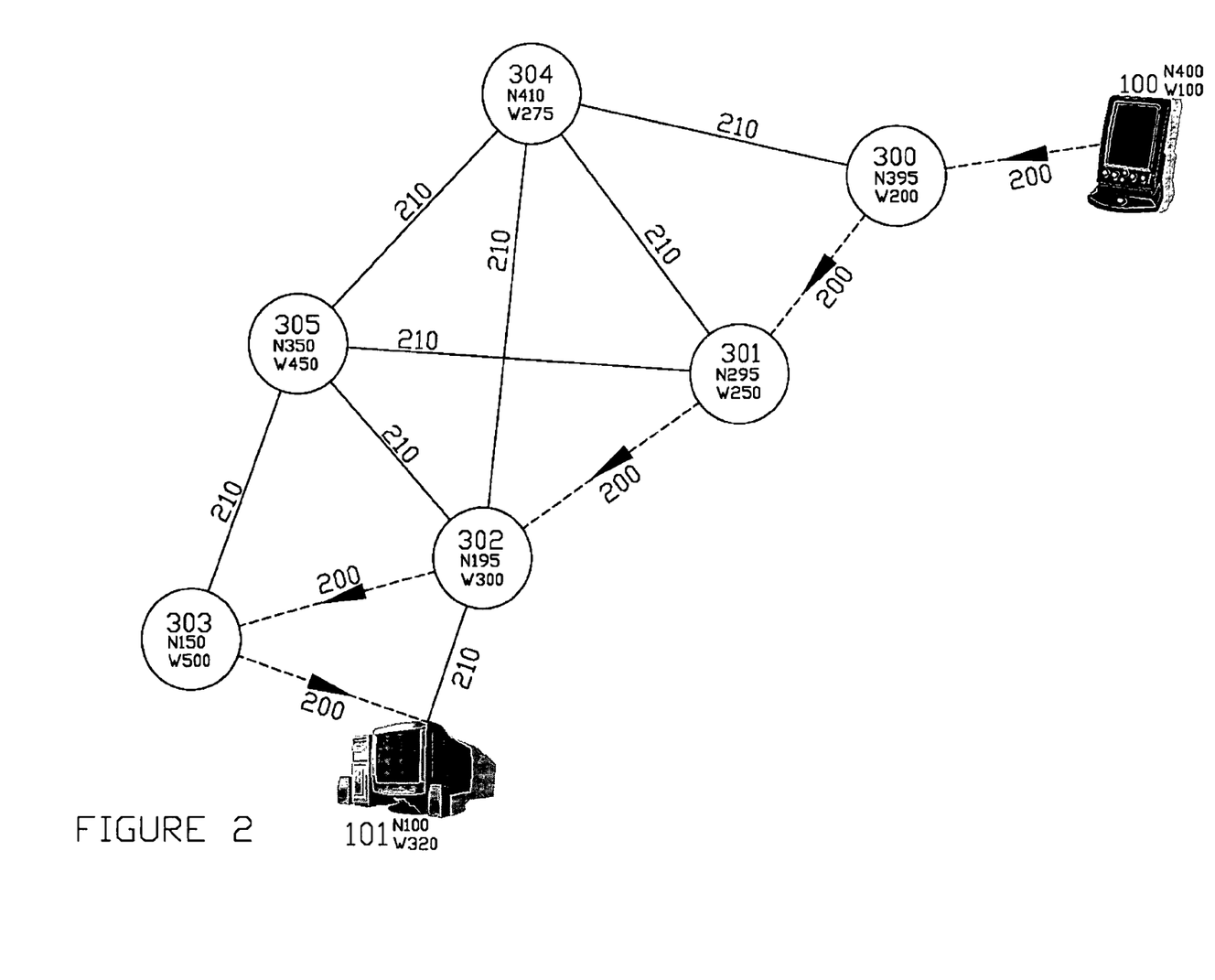
FIG. 2 is a perspective view of an alternate representation of FIG. 1 when one of the telecommunications nodes has an open switch on one of the shortest route legs.

Appropriately configured as used above is defined as data packets enabled with the present invention's transmission control protocol based on geo-position data, shown as northings and westings in FIGS. 1 and 2. This geo-position data can be used by nodes 300, 301, 302, 303, 304, 305 to mathematically self-determine the routing of data packets from PDA 100 to computer 101 over a telecommunications network.

The telecommunications network depicted consists of the following: items 200 are closed switch transmission paths, which are the shortest mathematically self-determined transmission paths of the telecommunications network from PDA 100 to computer 101. Closed switch transmission paths 200 may be either hard-wired or wireless, asymmetric or symmetric.

Items 210 are open switch transmission paths on the telecommunications network. These paths are not mathematically self-determined as being the shortest transmission paths from PDA 100 to computer 101. Open switch transmission paths 210 may be either hard-wired or wireless, asymmetric or symmetric.

The closed switch transmission paths 200 and the open switch transmission paths 210 are inter-connected between nodes 300, 301, 302, 303, 304, 305. Each node 300, 301, 302,

303, 304, 305 has a distinct geo-position, shown as northings and westings in FIG. 1. nodes 300, 301, 302, 303, 304, 305 are intelligent.

An intelligent node, intelligent means the node is a switched hub that is programmable, 300, 301, 302, 303, 304, 305 can read and use geo-position header data in a telecommunications data packet, to mathematically self-determine the shortest route between PDA 100 and computer 101. The data required is the geo-position of the origination device PDA 100, the geo-position of a node 300, 301, 302, 303, 304, 305, the geo-position of each node it is directly connected to, and the geo-position of the destination device, computer 101.

Prior to the telecommunication of data packets, some or all of the following call set-up information is required:

1) How long is the data packet?
2) Is the destination fixed or mobile?
3) Is the origination fixed or mobile?
4) Is the communication link asymmetric or symmetric?
5) Is the destination local or long distance?

As data packets are transmitted between PDA 100 and computer 101, nodes 300, 301, 302, 303, 304, 305 use geo-position data to mathematically self-determine the shortest route. The following mathematics is related to node 300. Other nodes 301, 302, 303, 304, 305 will perform similar calculations based on their specific geo-position data.

For the purpose of this discussion northings and westings are positive numbers, and southings and eastings are negative numbers.

1) Node 300 processor subtracts computer 101 northing from PDA 100 northing.
2) Node 300 processor temporarily stores northing difference result.

PDA 100$N$–Computer 101$N$=Northing Delta (Total Transmission Path)

3) Node 300 processor subtracts computer 101 westing from PDA 100 westing.
4) Node 300 processor temporarily stores westing difference result.

PDA 100$W$–Computer 101$W$=Westing Delta (Total Transmission Path)

5) Node 300 processor subtracts northing of node 304 from northing of node 300.
6) Node 300 processor temporarily stores result from step 5.

node 300$N$–node 304$N$=Northing Delta (node 300 to node 304)

7) node 300 processor subtracts westing of node 304 from westing of node 300.
8) Node 300 processor temporarily stores result from step 7.

node 300$W$–node 304$W$=Westing Delta (node 300 to node 304)

9) Node 300 processor subtracts northing of node 301 from northing of node 300.
10) Node 300 processor temporarily stores result from step 9.

node 300$N$–node 301$N$=Northing Delta (node 300 to node 301)

11) Node 300 processor subtracts westing node 301 from westing of node 300.
12) Node 300 processor temporarily stores result from step 11.

node 300$W$–node 301$W$=Westing Delta (node 300 to node 301)

13) Node 300 processor subtracts value stored in step 6 from value stored in step 2.
14) Node 300 processor temporarily stores result from step 13.

Step 2–Step 6=Northing Delta (Total Transmission Path Northing Difference Minus node 300 To node 304 Northing Difference)

15) Node 300 processor subtracts value stored in step 8 from value stored in step 4.
16) Node 300 processor temporarily stores results from step 15.

Step 4–Step 8=Westing Delta (Total Transmission Path Westing Difference Minus node 300 To node 304 Westing Difference)

17) Node 300 processor subtracts value stored in step 10 from value stored in step 2.
18) Node 300 processor temporarily stores results from step 17.

Step 2–Step 10=Northing Delta (Total Transmission Path Northing Difference Minus node 300 To node 301 Northing Difference)

19) Node 300 processor subtracts value stored in step 12 from value stored in step 4.
20) Node 300 processor temporarily stores results from step 19.

Step 4–Step 12=Westing Delta (Total Transmission Path Westing Difference Minus node 300 To node 301 Westing Difference)

21) Node 300 processor adds value stored in step 14 to value stored in step 16.
22) Node 300 processor temporarily stores results from step 21.

Step 14+Step 16=Directional Indicator For node 304

For this discussion, the term Directional Indicator is not absolute distance and direction, but is a weighted value based on accumulated Northings and Westings of the Total Transmission Path in relationship to a specific node.

23) Node 300 processor adds value stored in step 18 to value stored in step 20.
24) Node 300 processor temporarily stores results from step 23.

Step 18+Step 20=Directional Indicator For node 301

25) Node 300 processor uses smallest value stored in step 22 and step 24 as the logic to close the switch to node 301, and open the switch to node 304.

If: step 22<step 24,
Then: close switch to node 304,
Otherwise: open switch to node 304,
If: node 304 switch is open,
Then: close switch to node 301,
Otherwise: open switch to node 301

FIG. 2 depicts an alternate closed switch transmission path 200 as a result of the opening of a switch on node 302 causing data packets to be redirected to node 303 before completing the closed switch transmission path 200 to computer 101. The open switch on node 302 may be the result of a traffic overload, or repairs on transmission path 210 from node 302 to computer 101. Device 100 is shown as a Personal Digital Assistant (PDA) connected to a telecommunications network. Item 100 is shown as a PDA, but may be a computer, a network server, a wireless phone, or any other device that has the capability of being connected to a network.

Device 101 is shown as a computer connected to a telecommunications network. Item 101 is shown as a computer, but may be a PDA, a network server, a wireless phone, or any other device that has the capability of being connected to a network.

PDA 100 and computer 101 are depicted as having a distinct instantaneous geo-position. Instantaneous means if PDA 100 or computer 101 are mobile, they will report on a regular basis to the telecommunications network their instantaneous geo-position. A fixed asset, such as a node 300, 301, 302, 303, 304, 305 will have unchanging instantaneous positions. PDA 100's geo-position is depicted as northing and westing offsets in any one of various specific co-ordinate systems, such as but not limited to WGS-84, North American 1927 or 1983, Cape Canaveral, European 1979, or any user-defined co-ordinate system. These geo-positions can alternately be depicted as longitudes and latitudes.

PDA 100 is telecommunicating data packets, which can be data, to device 101 a computer, which is also connected to the same telecommunications network. PDA 100 and computer 101 are capable of transmitting and/or receiving appropriately configured data packets.

Appropriately configured is defined a data packets enabled with the present invention's transmission control protocol based on geo-position data, shown as northings and westings in FIGS. 1 and 2. This geo-position data can be used by nodes 300, 301, 302, 303, 304, 305 to mathematically self-determine the routing of data packets from PDA 100 to computer 101 over a telecommunications network.

The telecommunications network depicted consists of the following: items 200 are closed switch transmission paths, which are the shortest mathematically self-determined transmission paths of the telecommunications network from PDA 100 to computer 101. Closed switch transmission paths 200 may be either hard-wired or wireless, asymmetric or symmetric.

Items 210 are open switch transmission paths on the telecommunications network. These paths are not mathematically self-determined as being the shortest transmission paths from PDA 100 to computer 101. Open switch transmission paths 210 may be either hard-wired or wireless, asymmetric or symmetric.

The closed switch transmission paths 200 and the open switch transmission paths 210 are inter-connected between nodes 300, 301, 302, 303, 304, 305 has a distinct geo-position, shown as northings and westings in FIG. 1. Nodes 300, 301, 302, 303, 304, 305 are intelligent.

An intelligent node 300, 301, 302, 303, 304, 305 can read and use geo-position header data in a telecommunications data packet, to mathematically self-determine the shortest route between PDA 100 and computer 101. The data required is the geo-position of the origination device PDA 100, the geo-position of a node 300, 301, 302, 303, 304, 305, the geo-position of each node it is directly connected to, and the geo-position of the destination device, computer 101.

Prior to the telecommunication of data packets, some or all of the following call set-up information is required:
1) How long is the data packet?
2) Is the destination fixed or mobile?
3) Is the origination fixed or mobile?
4) Is the communication link asymmetric or symmetric?
5) Is the destination local or long distance?

In addition to the above types of information needed for connecting and routing VoIP calls soft switches use E.164, the standard for the North American Numbering Plan (NANP). This is the numbering system that phone networks use to know where to route a call based on the numbers entered into the phone keypad. In that way, a phone number is like an address:

(313) 555-1212
313=State
555=City
1212=Street address

As an example, soft switches know to use "313" to route the phone call to the region denoted by the area code. The "555" prefix sends the call to a central office, and the network routes the call using the last four digits, which are associated with a specific location. So based on that system, no matter where you are in the world, the number combination "(313) 555" will always put you in the same central office, which has a switch that knows which phone is associated with "1212."

The challenge with VoIP is that IP-based networks don't read phone numbers based on NANP. They look for IP addresses, which, as an example, look like this: 192.158.10.7 IP addresses correspond to a particular device on the network. It can be a computer, a router, a switch, a gateway or, in this case, a telephone. To make matters worse, IP addresses are not always static. They are assigned by a DHCP server on the network and generally change with each new connection. So the challenge with VoIP is figuring out a way to translate NANP phone numbers to IP addresses and then finding out the current IP address of the requested number. This mapping process referred to earlier is handled by a central call processor running a soft switch.

The central call processor is a piece of hardware running a specialized database/mapping program called a soft switch. Think of the user and the phone or computer associated with that user as one package—man and machine. That package is called the endpoint. The soft switch connects endpoints.

Soft switches know 1) where the endpoint is on the network, 2) what phone number is associated with that endpoint, and 3) the current IP address assigned to that endpoint When a call is placed using VoIP, a request is sent to the soft switch asking which endpoint is associated with the dialed phone number and what that endpoint's current IP address is. The soft switch contains a database of users and phone numbers. If it doesn't have the information it needs, it hands off the request downstream to other soft switches until it finds one that can answer the request. Once it finds the user, it locates the current IP address of the device associated with that user in a similar series of requests. It sends back all the relevant information to the softphone or VoIP phone, allowing the exchange of voice data between the two endpoints.

Soft switches work in tandem with the devices on the network to make VoIP possible. In order for all of these devices to work together, they must communicate in the same way. In order to make VoIP work, communication protocols must be used. The most widely used protocol is H.323, a standard created by the International Telecommunication Union (ITU). H.323 is a comprehensive and very complex protocol that was originally designed for video conferencing.

It provides specifications for real-time, interactive videoconferencing, data sharing and audio applications such as VoIP. Actually a suite of protocols, H.323 incorporates many individual protocols that have been developed for specific applications.

| H.323 Protocol Suite | | | |
|---|---|---|---|
| Video | Audio | Data | Transport |
| H.261 | G.711 | T.122 | H.225 |
| H.263 | G.722 | T.124 | H.235 |
| | G.723.1 | T.125 | H.245 |
| | G.728 | T.126 | H.450.1 |
| | G.729 | T.127 | H.450.2 |
| | | | H.450.3 |
| | | | RTP |
| | | | X.224.0 |

An alternative to H.323 has emerged with the development of Session Initiation Protocol (SIP). SIP is a much more streamlined protocol, developed specifically for VoIP applications. Smaller and more efficient than H.323, SIP takes advantage of existing protocols to handle certain parts of the process. Media Gateway Control Protocol (MGCP) is a third commonly used VoIP protocol that focuses on endpoint control. MGCP is geared toward features like call waiting.

Emergency 911 calls are a challenge with VoIP. Recently, the National Emergency Number Association (NENA) has issued the following standard for E911 services: Interim VoIP Architecture For Enhanced 9-1-1 Services, NENA 08-001, Issue 1 Dec. 6, 2005. Since VoIP uses IP-addressed phone numbers, not NANP phone numbers there is no easy way to associate a geographic location with an IP address without a database that associates current IP addresses to telephone numbers to geo-positions to street addresses. If the caller can't tell the 911 operator where he or she is located, then there is no way to know which call center to route the emergency call to and which EMS should respond. The present invention provides a method for routing data packets, IP addressed messages, and IP voice calls using geo-positions referenced in a database that associates currently assigned IP addresses to telephone number to geo-positions to street addresses. As described previously, geo-position data can come from a variety of sources, GPS, or other sources of geo-position data. The GPS or GIS data can be acquired by the VoIP or other IP device and transmitted in the data packets it is transmitting, or it can obtain geo-position data from a database that knows the geo-position of the IP device.

As data packets are transmitted between PDA 100 and computer 101 nodes 300, 301, 302, 303, 304, 305 use geo-position data to mathematically self-determine the shortest route. The purpose of this example is to show that an open switch on the shortest transmission path will not change the mathematical calculations to choose the next shortest route. Node 302 has previously forced the switch to remain open on transmission path 210 from node 302 to computer 101 due to either overload or repair. The following mathematics is related to node 302. Other nodes 300, 301, 303, 304, 305 will perform similar calculations based on their specific geo-position data.

For the purpose of this discussion northings and westings are positive numbers, and southings and eastings are negative numbers.

1) Node 302 processor subtracts computer 101 northing from PDA 100 northing.
2) Node 302 processor temporarily stores northing difference result.

PDA 100$N$–Computer 101$N$=Northing Delta (Total Transmission Path)

3) Node 302 processor subtracts computer 101 westing from PDA 100 westing.
4) Node 302 processor temporarily stores westing difference result.

PDA 100$W$–Computer 101$W$=Westing Delta (Total Transmission Path)

5) Node 302 processor subtracts northing of node 305 from northing of node 302.
6) Node 302 processor temporarily stores result from step 5.

node 302$N$–node 305$N$=Northing Delta (node 302 to node 305)

7) Node 302 processor subtracts westing of node 305 from westing of node 302.
8) Node 302 processor temporarily stores result from step 7.

node 302$W$–node 305$W$=Westing Delta (node 302 to node 305)

9) Node 302 processor subtracts northing of node 303 from northing of node 302.
10) Node 302 processor temporarily stores result from step 9.

node 302$N$–node 303$N$=Northing Delta (node 302 to node 303)

11) Node 302 processor subtracts westing node 303 from westing of node 302.
12) Node 302 processor temporarily stores result from step 11.

node 302$W$–node 303$W$=Westing Delta (node 302 to node 303)

13) Node 302 processor subtracts value stored in step 6 from value stored in step 2.
14) Node 302 processor temporarily stores result from step 13.

Step 2–Step 6=Northing Delta (Total Transmission Path Northing Difference Minus node 302 To node 305 Northing Difference)

15) Node 302 processor subtracts value stored in step 8 from value stored in step 4.
16) Node 302 processor temporarily stores results from step 15.

Step 4–Step 8=Westing Delta (Total Transmission Path Westing Difference Minus node 302 To node 305 Westing Difference)

17) Node 302 processor subtracts value stored in step 10 from value stored in step 2.

18) Node 302 processor temporarily stores results from step 17.

Step 2–Step 10=Northing Delta (Total Transmission Path Northing Difference Minus node 302 To node 303 Northing Difference)

19) Node 302 processor subtracts value stored in step 12 from value stored in step 4.
20) Node 302 processor temporarily stores results from step 19.

Step 4–Step 12=Westing Delta (Total Transmission Path Westing Difference Minus node 302 To node 303 Westing Difference)

21) Node 302 processor adds value stored in step 14 to value stored in step 16.
22) Node 302 processor temporarily stores results from step 21.

Step 14+Step 16=Directional Indicator For node 305

For this discussion, the term Directional Indicator is not absolute distance and direction, but is a weighted value based on accumulated Northings and Westings of the Total Transmission Path in relationship to a specific node.

23) Node 302 adds value stored in step 18 to value stored in step 20.
24) Node 302 processor temporarily stores results from step 23.

Step 18+Step 20=Directional Indicator For node 303

25) Node 302 processor uses smallest value stored in step 22 and step 24 as the logic to close the switch to node 303, and open the switch to node 305.

Switch from node 302 to Computer 101 is open for maintenance If: step 22<step 24, Then: close switch to node 305, Otherwise: open switch to node 305, If: node 305 switch is open, Then: close switch to node 303, Otherwise: open switch to node 303

Figure 3:
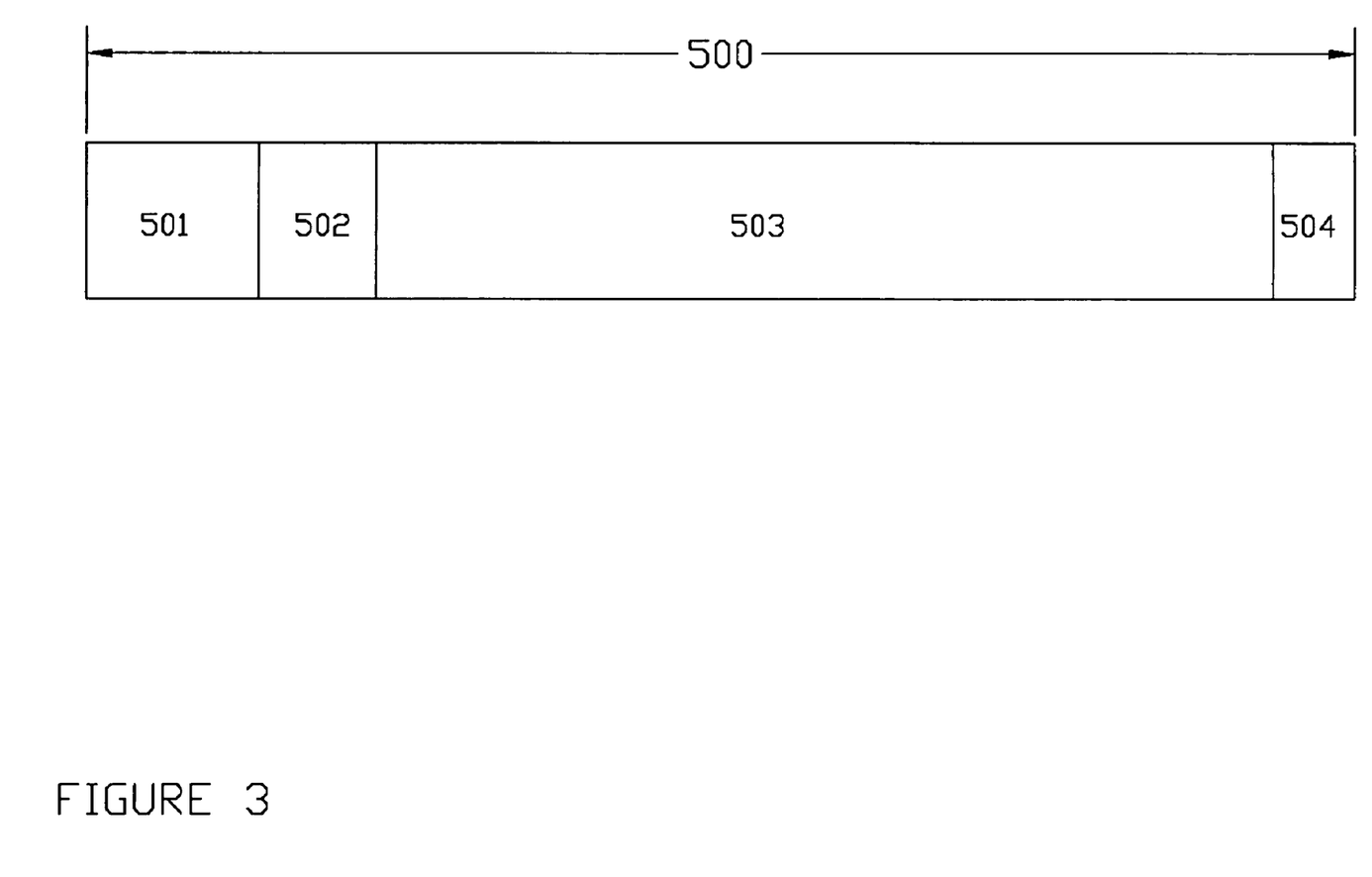
FIG. 3 is a representation of a Structured Linear Database with header space designed for geo-position data.

FIG. 3 depicts an alternate type of data packet based on a Structured Linear Database, which is described in detail in U.S. patent application Ser. No. 09/698,793 entitled METHOD OF TRANSMITTING DATA INCLUDING A STRUCTURED LINEAR DATABASE, to Melick, et al. The Structured Linear Database data packet 500 is comprised of position 501, 502, 503, 504. Position 501 is the space reserved for the geo-position header data. The minimum geo-position data required in the header is the geo-position of the device originating the data packet, and the destination device. Position 502 is the space reserved for the Linear File Allocation Table (LFAT). The LFAT 502 is the template that unlocks the encrypted data 503 contained in the Structured Linear Database data packet 500. Position 503 is the space reserved for the encrypted data contained in the Structured Linear Database data packet 500. Position 504 is the space reserved for the tailbit. The tailbit 504 defines the end of the Structured Linear Database data packet 500.

A still yet further feature of the present invention is the provision of a method of using geo-position IP address in conjunction with GPS time and date stamps to automatically create unique identification numbers that can become the basis of a mathematically significant, world-wide, universal numbering system that will identify the sender by geo-position, and with the addition of the GPS time and date stamp to the geo-position create unique purchase order numbers, ship confirm numbers, pallet identifiers, order numbers, etc., and can be used as self-routers for all types of business transactions. Outdoor geo-position information may be obtained using any Global Navigation Satellite System, such as GPS or GLONASS.

Indoor geo-positions may be obtained by any number of means. There are patented schemes such Speasl et al, U.S. Pat. No. 5,952,958, or an ultra wideband system such as Robert J. Fontana, U.S. Pat. No. 6,054,950, or the time domain, ultra wideband system that is integrated and correlated with GPS and documented in U.S. patent application Ser. No. 09/686,181, Melick et al.

In addition, indoor and outdoor geo-position information may be obtained from commercially available software that drives map based information. Commercially available software such as AutoCAD MAP, and AutoCAD Mapguide can be used to control, store, and retrieve GIS data, and other data stored in other types of databases.

In addition, indoor and outdoor geo-position information may be obtained from technology provided by companies like Skyhook Wireless. Skyhook Wireless technology (WPS-WiFi Positioning Systme) uses Wi-Fi systems to determine locations. Skyhook's technology is built on a nationwide network of Wi-Fi access points used to accurately pinpoint a user's position.

WPS is designed for the millions of laptop, tablet PC, PDA and Smartphone owners that have Wi-Fi capabilities and would like to generate driving directions, utilize proximity systems, implement vehicle/asset tracking and communicate location information to friends and coworkers. With WPS, users can easily take advantage of location-based services that are already widely available, without having to purchase additional hardware.

WPS can also complement other location technology, because unlike traditional systems, WPS has no line of sight requirements, is accurate to within twenty meters and can be used indoors or outdoors to determine location in seconds. WPS is compatible with 802.11 devices, integrates with all GPS designed applications and covers metro areas of the United States.

GPS time and date stamps may be obtained from any number of sources, such as, a GPS receiver operating outdoors. Also, when GPS time and date stamps are required indoors, master clocks are available that collect GPS data via a GPS antenna located in direct line-of-sight of GPS satellites and are connected to a GPS master clock unit. As examples, GPS master clocks are commercially available from Pitrone and Associates Model MGP-25, and from Spectracom using either their Models 8189 GPS Master Clock or 8188 Ethernet Time Server.

Examples of geo-position based IP addresses with the addition of GPS date and time stamps create unique identification numbers such as, but not limited to, the two shown below.

EXAMPLE 1

In Lat/Long/Alt—Consists Of 5 Components 42.02.17.00=Latitude North (Deg.,Min.,Sec.,Decimal Seconds)
90.05.18.05=Longitude West (Deg.,Min.,Sec.,Decimal Seconds)
285.00=Altitude (Feet.,Decimal Feet)
0964=GPS Week
514473=GPS Time Stamp (Truncated To A Whole Number) (Time In Seconds From Beginning Of GPS Week)

A Lat/Long/Alt geo-position IP address with GPS week and time stamp might look like: 042021700.090051805.0028500.0964.514473

EXAMPLE 2

Earth Centered Earth Fixed (ECEF)—Consists of 6 Components

"ECEF=Cartesian coordinates with center of earth being 0,0,0, (x,y,z)"
10,000,000.56=Northing from Greenwich (Meters., Decimal Meters)
8,900,753.45=Easting from Greenwich (Meters., Decimal Meters)
285.00=Altitude Above Mean Sea Level (Feet., Decimal Feet) _p1 Code No. For Datum, i.e. WGS84=1, North American 1927=2, Cape Canaveral=3, European 1979=4, etc.
0964=GPS Week
514473=GPS Time Stamp (Truncated To A Whole Number) (Time In Seconds From Beginning Of GPS Week)
An ECEF geo-position IP address with a GPS time and date stamp might look like: 1000000056.0890075345.0028500.03.0964.514473

In addition to using GPS information, the nodes, which can equipment, such as, but not limited to, hubs, routers, switches, soft switches, etc, can also be configured to operate as using XML switching. XML switching deployed on the present inventions nodes may use XML to tag geo-position information in order to facilitate the switching and routing data packets and IP addressed messages, and IP addressed voice calls.

Sarvega, Inc., DataPower, Cisco, and others manufacture Extensible Mark-up Language (XML) network equipment that provides intelligent routing of XML-based data at wire speeds The present invention can incorporate XML routing and switching technology to use tagged geographic information contained in data packets and IP addressed messages, and IP addressed voice calls in order to be used for routing and switching.

In addition to the above mentioned self-provisioning methods for obtaining and incorporating geographic information for use in intelligent data packet routing, there are many other public and private sources for obtaining and provisioning geographic information as described in U.S. patent application Ser. No. 10/413,801 to Melick, et al., entitled METHOD FOR UNIFIED MESSAGING, incorporated herein by reference. The United States Postal Service databases and systems map longitude and latitude to street address and zip code. Corporate entitles, such as telephone companies, maintain cross-reference databases for telephone number to latitude and longitude information, Also, fee-based service providers, such as Quova, map IP addresses to latitude and longitude.

The present invention can use geo-position information to aid in the caching of data and IP addressed messages closer to end-user. In addition, geographical information and/or time information can be used in associating expiration properties with the data. Based on expiration or related binding properties, access to data can be limited. For example, data can be accessible only during pre-defined time frames. Geographical and time information can be combined to create more complex binding properties.

As an example, a person in Company A wants to make a new purchase order using a geo-position IP address combined with a GPS time and date stamp. This creates a unique identifier that can't be numerically repeated. Company A's computer would mark its geo-position and create a GPS time and date stamp using an integrated business system software package of their choice. The geo-position IP address will identify the computer by geo-position. The geo-position IP address will also be used as a telecommunication data packet header in order to self-route the purchase order as an electronic document over any network. Company A would also specify delivery location and date using same the format described above. As these unique identifiers are mathematically significant numbers, they could be used by third party shippers to drive GIS software in order to plan pick-up and deliveries of product from Company Z using the geo-position IP addresses and GPS time and dates.

Company Z receiving the purchase order would confirm the receipt of Company A's purchase order by creating their own unique identifier and add it to the purchase order data packet.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method of routing data stored on a first device over a telecommunications network to a second device wherein the transmission path is based in part on geographic position, the method comprising:
    contacting a second device's home network server over the transmission path between the first device and the second device's home network server, wherein the second device geographic position is stored as at least a part of a modified internet protocol address on the home network server and periodically updated after the location of the second device changes;
    sending a request from the first device for the second device geographic position to the home network server;
    receiving at the first device, the second device geographic position as a part of the geo-position based internet protocol address from the home network server over the transmission path into memory;
    transmitting the data and second device geographic position as a part of the geo-position based internet protocol address from the first device over the transmission path to a node having a node geographic position, wherein the node reads the second device geographic position, accesses a recipient geographic position for possible recipients, accesses the node geographic position, compares the node geographic position with the second device geographic position and selects a recipient based at least in part on the geographic proximity of the recipient to the second device; and
    transmitting the data from the node to the recipient over the transmission path.

2. The method of routing data stored on a first device over a telecommunications network to a second device wherein the transmission path is based in part on geographic position of claim 1 wherein the transmission path is wired.

3. The method of routing data stored on a first device over a telecommunications network to a second device wherein the transmission path is based in part on geographic position of claim 1 wherein the transmission path is wireless.

4. The method of routing data stored on a first device over a telecommunications network to a second device wherein the transmission path is based in part on geographic position of claim 1 wherein the transmission path includes wireless and wired portions.

5. The method of routing data stored on a first device over a telecommunications network to a second device wherein the transmission path is based in part on geographic position of claim 1 wherein the second device geographic position is supplemented with a device identifier and wherein the device identifier identifies the second device in a manner independent from the geographic position of the second device.

6. The method of routing data stored on a first device over a telecommunications network to a second device wherein the transmission path is based in part on geographic position of claim 1 wherein the second device is the recipient.

7. The method of claim 1 wherein the second device is a mobile device.

8. A method of routing data stored on a first device over a communications network to a second device wherein the transmission path is based in part on geographic position, the method comprising:
   requesting a machine address associated with the second device over the communications network, wherein the second device geographic position is stored as at least a part of the machine address on the second device's home network server and periodically updated after the location of the second device changes;
   determining a geographic position of the second device at least partially based on the geo-position based machine address associated with the second device received from the home network server;
   transmitting the data and second device geographic position from the first device over the transmission path to a node having a node geographic position, wherein the node reads the geographic position of the second device, accesses a recipient geographic position for possible recipients, accesses the node geographic position, compares the node geographic position with the geographic position of the second device and selects a recipient based at least in part on geographic proximity of the recipient to the second device; and
   transmitting the data from the node to the recipient over the transmission path.

9. The method of claim 8 wherein the second device is a mobile device.

10. The method of claim 8 wherein the geographic position comprises latitude, longitude and altitude.

11. A method of routing data stored on at least one second device over a telecommunications network to a first device wherein the transmission path is based in part on geographic position, the method comprising:
    contacting a second device's home network server, wherein a second device geographic position is stored as at least a part of a modified internet protocol address on the home network server and periodically updated as location of the second device changes;
    sending a request from the first device for the geo-position based internet protocol address of the second device to the home network server;
    receiving at the first device into memory, a list of second device recipients' geo-position based internet protocol addresses chosen in part by geographic proximity to the first device by the home network server;
    transmitting a request for data from the first device to a closest second device recipient from the list of second device recipients; and
    transmitting the data stored on the second device to the first device.

12. The method of claim 11 wherein the transmission path is wired.

13. The method of claim 11 wherein the transmission path is wireless.

14. The method of claim 11 wherein the transmission path includes wireless and wired portions.

15. A method of routing data stored on at least one second device over a network to a first device wherein the transmission path is based in part on geographic position, the method comprising:
    contacting a second device's home network server, wherein the second device geographic position is stored as at least a part of a modified internet protocol address on the home network server and periodically updated as location of the second device changes;
    sending a request from the first device for the second device geo-position based internet protocol address to the home network server;
    receiving at the first device into memory, a possible list of second device recipients' geo-position based internet protocol addresses that has been chosen in part by geographic proximity by the home network server;
    transmitting a request for data from the first device to the closest second device recipient from the possible list of second device recipients; and
    transmitting the data stored on the second device to the first device.

16. The method of claim 15 wherein the internet protocol addresses include geopositions.

17. The method of claim 15 wherein the second device is a mobile device.

18. A method of routing data stored on a first device over a network to at least one second device wherein the transmission path is based in part on geographic position, the method comprising:
    accessing a list of at least one second device recipient modified internet protocol address and corresponding geographic position, wherein the geographic position is stored as at least a part of the modified internet protocol address on the second device's home network server and periodically updated as location of the second device changes;
    determining a shortest distance from the first device to each of at least one second device in said list; and
    transmitting the data stored on the first device to a geographically closest second device in said list.

19. The method of claim 18 further comprising updating the list as position of the at least one second device changes.

20. The method of claim 18 wherein the list is stored on a home network server of the second device.

* * * * *